(No Model.)
J. K. TERRELL.
BIRD TRAP.
No. 466,473. Patented Jan. 5, 1892.
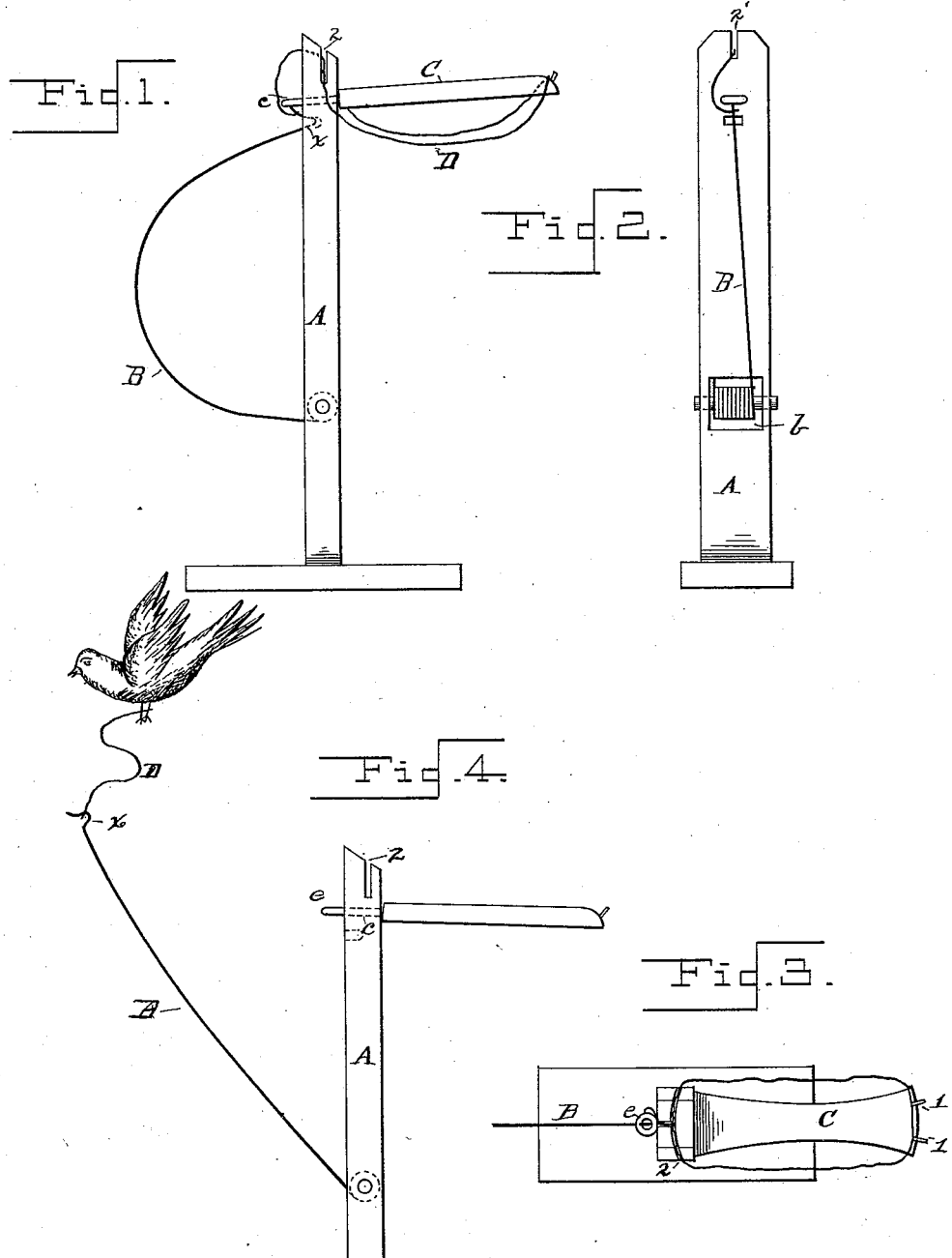
Witnesses
W. H. Courtland
Stephen L. Coles
Inventor
John K. Terrell
by Ross H. Read
Atty

UNITED STATES PATENT OFFICE.

JOHN K. TERRELL, OF OMRO, WISCONSIN.

BIRD-TRAP.

SPECIFICATION forming part of Letters Patent No. 466,473, dated January 5, 1892.

Application filed May 20, 1891. Serial No. 393,382. (No model.)

*To all whom it may concern:*

Be it known that I, JOHN K. TERRELL, a citizen of the United States, residing at the town of Omro, in the county of Winnebago and State of Wisconsin, have invented certain new and useful Improvements in Bird-Traps; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in bird-traps; and the object of my invention is to effectually trap or snare birds that perch and to secure them by the feet without killing them.

In the accompanying drawings, Figure 1 is a side view of the trap when set. Fig. 2 is an end view, and Fig. 3 a top view, of the same. Fig. 4 is a representation of the trap after it is sprung.

Similar letters and figures refer to similar parts throughout the several views.

A is the standard, which may be attached to any supporting-surface.

B is a wire spring coiled at the lower end in the opening in the standard at $b$ and attached to the standard.

C is the perch attached to the upper portion of the standard by means of a rod $c$ connecting therewith, extending loosely through an opening in the standard and terminating in an eye $e$, which receives the upper end of the spring B when the trap is set.

D is a slip-noose attached to the end of the spring B and extending, when the trap is set, down below each side of the perch C. The outer end of the perch C, Fig. 3, is made broad, so as to spread the noose, and the noose is held in place by the small pins 1 1 and the grooves 2 2' in the upper end of the standard, thus preventing the wind from disarranging the noose.

A projection in the wire is provided at $x$, which fits into an opening in the standard when the trap is set. This is for the purpose of holding the wire B so that the weight of the bird upon the perch C will pull the eye $e$ over the end thereof.

When the trap is set, the noose is spread around and below the perch. The weight of the bird lighting upon the perch presses it downward, and thereby raises the eye $e$ and releases the upper end of the spring B, and the spring immediately flies away from the perch, tightening the noose around the feet of the bird and securing it until released. The bird soon tires from its efforts to release itself and is held alive until released.

The trap may be adapted to all sizes of birds.

Therefore what I claim as my invention, and desire to secure by Letters Patent, is—

1. A bird-trap comprising a slip-noose, a spring to which one end of the cord forming the noose is attached, a detent for engaging the end of the spring, a perch adapted to release the detent, and means for supporting the noose on the perch, the noose being disconnected from all parts of the trap except the spring, whereby it is free to follow the latter when the trap is sprung.

2. In a bird-trap, the combination, with a post, of a loosely-mounted perch provided with a detent on its end, a spring adapted to be locked in a condition of tension by said detent, and a cord attached to the spring and provided with a noose resting on the perch, but disconnected from any part thereof except the spring, whereby it is free to follow the latter when the trap is sprung, as and for the purpose described.

In testimony whereof I affix my signature in presence of two witnesses.

JOHN K. TERRELL.

Witnesses:
EDWIN CLIFFORD,
CHARLES J. SCHMITT.